United States Patent Office

Re. 26,907
Reissued June 9, 1970

26,907
ALUMINUM ALLOYS AND ARTICLES MADE THEREFROM

William M. Doyle and Stanley J. Ashton, Slough, England, assignors to High Duty Alloys Limited, Slough, England No Drawing. Original No. 3,414,406, dated Dec. 3, 1968, Ser. No. 482,598, Aug. 25, 1965. Application for reissue May 13, 1969, Ser. No. 830,899
Int. Cl. C22c *21/02*
U.S. Cl. 75—142 27 Claims

Matter enclosed in heavy brackets [ ] appears in the original patent but forms no part of this reissue specification; matter printed in italics indicates the additions made by reissue.

ABSTRACT OF THE DISCLOSURE

Copper-, manganese-, and titanium-containing aluminium alloys are given improved working properties and substantially increased creep resistance by inclusion of 0.1 to 0.5 weight percent of magnesium. The addition of silver, from 0.2 to 0.4 weight percent improves the working properties of these alloys.

These novel alloys have the following compositions, by weight:

| | Percent |
|---|---|
| Copper | 5 to 7 |
| Titanium | 0.01 to 0.3 |
| Manganese | 0.01 to 0.5 |
| Silicon | 0.1 to 0.35 |
| Magnesium | 0.1 to 0.5 |
| Iron | up to 0.4 |
| Silver | up to 0.5 |
| Aluminium (and impurities) | Balance |

These alloys are especially adapted for forging, stamping, extrusion and rolling in fabrication of aero-engine components and aircraft skin and structural members. To develop the optimum properties for such service, after working the alloy articles are solution heat-treated for up to 30 hours at 515°–550° C., quenched and thereafter artificially aged for 5–36 hours at 170°–250° C.

Summary of the invention

This invention is concerned with aluminium alloys containing copper, manganese and titanium and articles made from such alloys.

Wrought or hot worked alloys of aluminium containing copper, manganese and titanium have been used for aero-engine components operating at elevated temperatures and have found particular application for service in the temperature range 200–300° C. Although alloys of this range, an improvement in the room temperature and this type have satisfactory properties at temperatures in lower elevated temperature tensile properties, particularly the proof stress values and the creep resistance, is desirable.

We have discovered that the addition of 0.1 to 0.5 percent by weight of magnesium to aluminium base alloys containing 5 to 7 percent copper, 0.01 to 0.3 percent titanium, 0.01 to 0.5 percent manganese, 0.1 to 0.35 percent silicon, 0 to 0.5 percent silver and not more than 0.4 percent iron, the balance being aluminium, very significantly improves the room temperature mechanical properties of the alloys in the wrought or worked state and also improves the elevated temperature properties, including the creep resistance, by substantial amounts over the entire temperature range up to 350° C. In addition, the alloys with the magnesium addition may be readily welded by the argon arc process using parent metal or conventional filler rod materials.

The alloys may contain the normal amounts of impurities, which may, for example, consist of or include one or more of the elements nickel, chromium and zinc, in an amount up to a total of about 0.25% by weight, and boron from nil to about 0.1% by weight.

Accordingly, the invention provides an aluminium alloy containing the following elements in the following proportions by weight:

| | Percent |
|---|---|
| Copper | 5 to 7 |
| Titanium | 0.01 to 0.3 |
| Manganese | 0.01 to 0.5 |
| Silicon | 0.1 to 0.35 |
| Iron | 0 to 0.4 |
| Magnesium | 0.1 to 0.5 |
| Silver | 0 to 0.5 |
| Aluminium and impurities | Remainder |

By the wrought or worked state is meant rolled, forged, stamped, extruded or otherwise mechanically worked.

The alloys are particularly suitable for aero-engine components and for aircraft skinning and structural members which are required to withstand complex stress systems at elevated temperatures for long service lives.

To obtain more fully the potential benefits of alloys made according to this invention, the alloys should after working be solution heat-treated for up to 30 hours between 515 and 550° C., quenched and then artificially aged for 5 to 36 hours between 170 and 250° C.

The solution heat-treated article may be quenched in oil or water or molten salt. The maximum properties will be developed in parts which have been quenched by the most rapid means but such rapid quenching may result in too high a level of residual internal stress in certain designs of component. Therefore, for these critical applications, quenching into hot or boiling water or molten salt at 150°–250° C. may be employed. These latter two quenching treatments very significantly reduce the internal stress level, with concomitant reductions in room temperature and elevated temperature properties but the levels of strength are still significantly higher than those of comparable parts in the alloys without magnesium.

We have found, for certain components on which extensive machining is to be carried out in the fully heat-treated condition and in which the dimensional tolerances must be held to very close limits, the alloys made according to this invention, when solution heat-treated and then quenched into molten salt and subsequently artificially aged, were the only aluminium base alloys of those tested which showed a satisfactory low degree of distortion during the machining.

The artificial ageing time and temperature will depend on the required service life and operational temperature envisaged for the alloy article. For service at room or moderately elevated temperatures, ageing treatments at temperatures between about 170 and 200° C. are employed but for service above about 175° C., higher temperatures in the range 190 to 250° C. produce the optimum elevated temperature performance. Ageing at temperatures above 210° C. is required to expand fully the crystal lattice so that no further significant dimensional changes will occur during prolonged service at elevated temperatures.

Detailed description of the invention

The optimum properties for any particular wrought form are achieved by careful selection of the alloying elements, and in particular the magnesium, within the ranges specified hereinbefore. We have found that the best balance of properties in all wrought forms is given by aluminium base alloys containing, by weight, 5.7 to 6.3% copper, 0.1 to 0.3% manganese, 0.1 to 0.25% silicon, 0.05 to 0.15% titanium, up to 0.4% iron, 0 to 0.05% for each of nickel, zinc and chromium and optionally 0.2 to 0.4% silver. With these preferred ranges of elements, we have found that in the case of forgings and extrusions, the optimum balance of properties is achieved with a magnesium content of 0.15 to 0.30% and, in the case of rolled material (including sheet, strip and plate), with 0.25 to 0.4% magnesium. The balance in each case is aluminium and normal impurities. Accordingly, we prefer to employ alloys of these compositions.

For forgings, extrusions and sheet made from silver-free alloys containing the preferred ranges of elements stated hereinbefore, the optimum solution treatment temperature is 525 to 535° C. and the optimum time of treatment will depend on the particular wrought form and section thickness but will be, for forgings and extrusions, in the range ½ to 20 hours, and, for sheet and strip, for up to 8 hours (normally between 5 minutes and 2 hours). Following solution treatment and quenching, the best balance of room and elevated temperature mechanical properties is obtained after artificial ageing for 8 to 24 hours at 190 to 200° C. in the case of sheet and extrusions, and for the same time but at 210 to 220° C. for forgings. If, in the silver-free alloys, higher magnesium contents are used, that is, from 0.30 to 0.5% magnesium in the case of forgings and extrusions, and from 0.4 to 0.5% magnesium in the case of sheet and strip, a reduced solution treatment temperature of the order of 515 to 525° C. is necessary in each case in order to avoid the phenomenon of overheating, due to the liquation of low melting point constituents consisting of complex eutectics containing aluminium, copper, and magnesium. The presence of overheating is undesirable because it causes blistering and can result in a reduction in one or more of the mechanical properties, in particular, fatigue and creep resisting properties. Overheating in the microstructure of wrought products is not acceptable for highly stressed components, for example, in aircraft skinning and structural members and aero-engine parts. Although the phenomenon of over-heating may as mentioned above be avoided by the use of lower solution heat-treatment temperatures than in the preferred range, this results in a reduction in mechanical properties.

We have discovered that the inclusion of silver in the preferred alloys, as described hereinbefore, produces an improvement in mechanical properties in all wrought forms. The inclusion of too great an amount of silver reduces the temperature at which the onset of over-heating occurs and thus acts similarly in this respect to magnesium.

Silver-containing forged or extruded alloys to the preferred compositions and subjected to solution treatment for ½ to 20 hours at 515 to 535° C., quenching and artificially ageing for 8 to 24 hours at 210 to 220° C. for forgings, and to solution treatment for ½ to 20 hours at 515 to 535° C., quenching and artificially ageing for 8 to 24 hours at 190 to 200° C. in the case of extrusions, have higher room temperature tensile properties, notably proof stress, and higher elevated temperature creep resistance than the corresponding silver-free alloys to the preferred compositions described hereinbefore. Increasing the silver addition above the preferred range, namely raising the content to between 0.4 and 0.5% silver, in forged and extruded alloys to the preferred compositions, results in over-heating when solution heat-treatment is carried out at 525 to 535° C. and, to ensure that over-heating does not take place, we have found that the solution heat-treatment temperature should be 515–525° C. and, in this condition of solution heat-treatment, followed by quenching and artificially ageing for 8 to 24 hours at 210 to 220° C. and 190 to 200° C. for forgings and extrusions, respectively, there is no advantage in mechanical properties over the alloy containing 0.2 to 0.4% silver heat-treated as described hereinbefore.

In sheet and strip made from silver-containing alloys to the preferred compositions, over-heating occurs during solution heat-treatment at 525 to 535° C., in contradistinction to the corresponding silver-free sheet. In order to avoid over-heating, it is necessary to reduce the solution heat-treatment temperature to 520 to 530° C., the time of treatment being up to 8 hours (normally 5 minutes to 2 hours). In addition, for silver-containing alloys in the form of sheet or strip, after quenching, the artificial ageing treatment to give the optimum balance of mechanical properties is 8 to 24 hours at 175 to 185° C. instead of 190 to 200° C. Sheet and strip in the preferred silver-containing composition, solution heat-treated at 520 to 530° C. and artificially aged at 175 to 185° C. has a superior room temperature tensile proof stress to sheet and strip in the preferred silver-free composition, solution heat-treated at 525 to 535° C. and artificially aged at 190 to 200° C., while still maintaining the same high level of elevated temperature creep resistance. When the silver addition is increased above the preferred level for sheet and strip, described hereinbefore, namely the content is raised to between 0.4 and 0.5% silver, over-heating occurs during solution heat-treatment at temperatures above 525° C. and to prevent over-heating taking place, the solution heat-treatment temperature has to be reduced to 515 to 525° C. The 0.4 to 0.5% silver-containing sheet or strip solution heat-treated at 515 to 525° C. and artificially aged at 175 to 185° C. shows no advantage in room temperature tensile properties or elevated temperature creep resistance over the preferred silver-containing composition sheet or strip heat-treated according to the preferred condition described hereinbefore.

The alloys made according to the invention show particularly advantageous properties in the form of rolled sheet or strip. In the sheet or strip form, the alloys may be used unclad or clad on one or both major faces with a layer of commercially pure aluminium, or with an alloy compounded of commercially pure aluminium and 0.8 to 1.2 percent by weight of zinc, or with a corrosion-resistant, heat-treatable aluminium base alloy containing 0.4 to 1.4 percent magnesium, 0.2 to 1.3 percent silicon, 0.0 to 1.0 percent manganese, 0.0 to 0.3 percent chromium, and 0.8 to 1.2 percent zinc, all percentages being by weight, the balance being aluminium and the normal amounts of impurities and grain refining elements found in such alloys.

The following examples demonstrate the improvement in the room and elevated temperature tensile properties and in the creep and fatigue resistance of alloys made according to this invention. The chemical composition of each of the alloys used in these tests is given in Table 1, aluminium and normal impurities constituting the balance in each case.

TABLE 1.—PERCENTAGE COMPOSITION, BY WEIGHT, OF ALLOYS USED

| Alloy | Cu | Mn | Fe | Si | Ti | Mg | Ag |
|---|---|---|---|---|---|---|---|
| A | 6.0 | 0.27 | 0.16 | 0.12 | 0.17 | | |
| B | 5.95 | 0.26 | 0.16 | 0.11 | 0.15 | 0.20 | |
| C | 5.90 | 0.26 | 0.18 | 0.19 | 0.12 | 0.34 | |
| D | 6.0 | 0.26 | 0.18 | 0.16 | 0.14 | 0.21 | 0.29 |
| E | 5.96 | 0.25 | 0.16 | 0.16 | 0.15 | 0.21 | 0.49 |
| F | 6.07 | 0.27 | 0.23 | 0.17 | 0.13 | 0.02 | |
| G | 5.82 | 0.25 | 0.16 | 0.14 | 0.16 | 0.20 | |
| H | 6.0 | 0.27 | 0.16 | 0.15 | 0.14 | 0.31 | |
| I | 5.91 | 0.25 | 0.15 | 0.18 | 0.12 | 0.32 | 0.29 |
| J | 5.88 | 0.25 | 0.14 | 0.18 | 0.12 | 0.33 | 0.47 |
| K | 5.95 | 0.23 | 0.20 | 0.11 | 0.13 | 0.02 | |
| L | 6.07 | 0.27 | 0.15 | 0.15 | 0.13 | 0.20 | |
| M | 6.08 | 0.27 | 0.15 | 0.18 | 0.14 | 0.33 | |

Alloys A to J were cast by the semi-continuous casting process, alloys A to E and F to J being cast in round billets and rectangular rolling slabs, respectively.

The billets in alloys A to E were forged in the normal way into 1 inch diameter bar. The bars were solution heat-treated for 20 hours at 530° C., unless specified to the contrary in the various tables, quenched into boiling water and then artificially aged for 16 hours at 215° C. Suitable test-pieces were cut and machined from forged bars in each of the alloys and were tensile tested at room and elevated temperature, creep tested and fatigue endurance tested according to the various schedules in Tables 2, 3 and 4. The results of these tests are also given in the same tables.

The improvement in the room and elevated temperature tensile properties, creep and fatigue resistances shown by Alloy B, made according to this invention, is evident by comparing the results of the tests on this alloy with those obtained in Alloy A. The apparent advantage in room temperature proof stress shown by Alloy C, in comparison with Alloy B, is nullified by the deterioration in long term creep resistance of the former alloy.

ances at 200° C., resulting from solution heat-treating forged bar in the preferred Alloy B, at a temperature of 520° C., which is lower than the preferred range, namely 525 to 535° C., is obvious on examination of the test results detailed in Table 3.

The room temperature tensile properties and the results of creep tests carried out at 200° C. on forged bar in Alloy B, and in the two silver containing Alloys D and E, are given in Table 4. These tests were carried out on two sets of bars solution heat-treated for 20 hours at 520° C. and 530° C., respectively, followed by boiling water quenching and artificially ageing for 16 hours at 215° C.

TABLE 2

| Forged bar | Alloy A | | | Alloy B | | | Alloy C | | |
|---|---|---|---|---|---|---|---|---|---|
| | 0.1% P.S., tons/sq. in. | U.T.S., tons/sq. in. | Elong., percent | 0.1% P.S., tons/sq. in. | U.T.S., tons/sq. in. | Elong., percemt | 0.1% P.S., tons/sq. in. | U.T.S., tons/sq. in. | Elong., percent |
| Room Temperature Tensile | 15.6 | 25.0 | 11 | 23.1 | 30.4 | 8 | [1] 23.8 | [1] 29.5 | [1] 8 |
| Elevated Temperature Tensile at 150° C. after 200 hours soak | 14.3 | 21.0 | 22 | 20.9 | 25.8 | 16 | | | |
| Elevated Temperature Tensile at 200° C. after 200 hours soak | 9.3 | 14.4 | 18 | 12.8 | 16.3 | 20 | | | |
| Creep Stress (tons/sq. in.) to produce 0.1% total plastic Creep Strain at 200° C. in— | | | | | | | | | |
| 100 hrs | | 6.3 | | | 11.2 | | | | |
| 1,000 hrs | | 5.0 | | | 9.4 | | | | |
| Creep Stress (tons/sq. in.) to produce 0.1% total Plastic Creep Strain at 250° C. in— | | | | | | | | | |
| 100 hrs | | 3.6 | | | 6.6 | | | | |
| 1,000 hrs | | 2.8 | | | 3.9 | | | | |
| Total Plastic Creep Strain (percent) produced at 200° C. with a Creep Stress of 10 tons/sq. in. in— | | | | | | | | | |
| 100 hrs | | ([2]) | | | 0.045 | | | [1] 0.046 | |
| 500 hrs | | | | | 0.081 | | | [1] 0.172 | |
| 1,000 hrs | | | | | 0.114 | | | ([3]) | |
| Semi-range of stress (tons/sq. in.) to produce failure in 10 cycles under rotating cantilever conditions at— | | | | | | | | | |
| R.T | | 12.3 | | | 16.8 | | | | |
| 200° C | | 11.4 | | | 14.4 | | | [1] 13.5 | |
| 300° C | | 9.0 | | | 11.4 | | | | |

[1] These specimens, containing 0.34 percent magnesium, were solution treated at 520° C. for 20 hours instead of at 530° C., as were Alloys A and B followed by boiling water quenching and aging for 16 hours at 215° C., because the solution treatment of Alloy C at 530° C. produced severe overheating in the microstructure.
[2] Fractured in 105 hrs;
[3] Fractured in 960 hrs.

TABLE 3

| Forged bar in Alloy B | Solution treatment for 20 hrs. at 520° C. followed by boiling water quenching and artificially aging for 16 hours at 215° C. | | | Solution treatment for 20 hrs. at 530° C. followed by boiling water quenching and artificially aging for 16 hours at 215° C. | | |
|---|---|---|---|---|---|---|
| | 0.1% P.S., tons/sq. in. | U.T.S., tons/sq. in. | Elong., percent | 0.1% P.S., tons/sq. in. | U.T.S., tons/sq. in. | Elong., percent |
| Room Temperature Tensile | 22.6 | 29.0 | 9½ | 23.1 | 30.4 | 8 |
| Total Plastic Creep Strain (percent) produced at 200° C. with a creep stress of 10 tons/sq. in. in— | | | | | | |
| 100 | | 0.067 | | | 0.045 | |
| 500 hrs | | 0.148 | | | 0.081 | |
| 1,000 hrs | | 0.297 | | | 0.114 | |
| Semi-range of stress (tons/sq. in.) to produce failure in 10[1] cycles uder rotating cantilever conditions at 200° C | | 13.6 | | | 14.4 | |

TABLE 4

| Forged bar | Alloy B | | | Alloy D | | | Alloy E | | |
|---|---|---|---|---|---|---|---|---|---|
| Solution treated quenched in boiling water and artificially aged for 16 hrs. at 215° C. | 0.1% P.S., tons/sq. in. | U.T.S., tons/sq. in. | Elong., percent | 0.1% P.S., tons/sq. in. | U.T.S., tons/sq. in. | Elong., percent | 0.1% P.S., tons/sq. in. | U.T.S., tons/sq. in. | Elong., percent |
| Room Temperature Tensile: | | | | | | | | | |
| Solution treated for 20 hours at 520° C | 22.6 | 29.0 | 9½ | 24.2 | 29.8 | 8 | 24.7 | 29.2 | 6 |
| Solution treated for 20 hours at 530° C | 23.1 | 30.4 | 8 | 25.6 | 30.5 | 6 | | ([1]) | |
| Total Plastic Creep Strain (percent) produced after 100 hrs. at 200° C. with a creep stress of 10 tons/sq. in.: | | | | | | | | | |
| Solution treated for 20 hours at 520° C | | 0.067 | | | 0.023 | | | 0.034 | |
| Solution treated for 20 hours at 530° C | | 0.045 | | | 0.037 | | | ([1]) | |
| Total Plastic Creep Strain (percent) produced after 500 hrs. at 200° C. with creep stress of 10 tons/sq. in.: | | | | | | | | | |
| Solution treated for 20 hours at 520° C | | 0.148 | | | 0.069 | | | 0.088 | |
| Solution treated for 20 hours at 530° C | | 0.081 | | | 0.100 | | | ([1]) | |

[1] Overheating in microstructure.

The reduction in room temperature tensile proof and ultimate tensile strength and in creep and fatigue resist- The benefit to the room temperature tensile proof stress and to the creep resistance at 200° C. of the addition of 0.29% silver to the forged bar containing magnesium in

TABLE 5

| Al plus 1% Zn clad sheet | Alloy F | | | Alloy G | | | Alloy H | | |
|---|---|---|---|---|---|---|---|---|---|
| | 0.1% P.S., tons/sq. in. | U.T.S., tons/sq. in. | Elong., percent | 0.1% P.S., tons/sq. in. | U.T.S., tons/sq. in. | Elong., percent | 0.1% P.S., tons/sq. in. | U.T.S., tons/sq. in. | Elong., percent |
| Room Temperature Tensile | 15.5 | 23.3 | 10 | 20.8 | 26.6 | 9 | 22.4 | 28.5 | 9½ |
| Elevated Temperature Tensile after 400 hrs. soak at 150° C. | 12.7 | 17.9 | 16 | 18.0 | 22.0 | 13 | 19.2 | 23.7 | 12 |
| Recovery Room Temperature Tensile after 400 hrs. soak at 150° C | 15.1 | 23.5 | 12 | 21.1 | 26.8 | 10 | 21.7 | 28.2 | 10 |
| Total Plastic Creep Strain (percent) after 100 hrs, at 175° C. with a 10 tons/sq. in. creep stress | | 2.3 | | | 0.10 | | | 0.043 | |
| Total Plastic Creep Strain (percent) after 1,000 hrs. at 130° C. with a 13 tons/sq. in. creep stress | | (1) | | | 0.060 | | | 0.039 | |

[1] Fractured in 900 hrs.

TABLE 6

| Al plus 1% Zn clad sheet | Alloy H | | | | | | Alloy I | | | Alloy J | | |
|---|---|---|---|---|---|---|---|---|---|---|---|---|
| | Solution treated for 30 mins. at 530° C., cold water quenched, artificially aged for 16 hours at— | | | | | | Solution treated for 30 mins. at 525° C., cold water quenched, artificially aged for 16 hours at 180° C. | | | Solution treated for 30 mins. at 520° C., cold water quenched, artificially aged for 16 hours at 180° C. | | |
| | 180° C. | | | 185° C. | | | | | | | | |
| | 0.1% P.S., tons/sq. in. | U.T.S., tons/sq. in. | Elong., percent | 0.1% P.S., tons/sq. in. | U.T.S., tons/sq. in. | Elong., percent | 1.0% P.S., tons/sq. in. | U.T.S., tons/sq. in. | Elong., percent | 0.1% P.S., tons/sq. in. | U.T.S., tons/sq. in. | Elong., percent |
| Room Temperature, Tensile | 23.1 | 28.7 | 9 | 22.4 | 28.5 | 9½ | 23.8 | 28.8 | 9½ | 23.7 | 28.3 | 9½ |
| Total Plastic Creep Strain (percent) in 100 hrs. at 175° C. with a creep of 10 tons/sq. in | | 0.067 | | | 0.043 | | | 0.046 | | | 0.042 | |

the preferred range and solution heat-treated at 520° C. becomes clearly evident on comparing the test results detailed in Table 4 for Alloy D under these conditions with the results for Alloy B solution heat-treated at either 520° or 530° C. The advantage of solution heat-treating the silver-free Alloy B at 530° C. is also obvious from the results given in the same table. In the case of Alloy E, containing 0.21% magnesium and 0.49% silver, the microstructure of the forged bar showed that over-heating had occurred during solution heat-treatment at 530° C. but that after solution treatment for 20 hours at 520° C., the structure showed no signs of over-heating.

Cladding plates in an alloy compounded of commercially pure aluminum and about 1% zinc were strapped by means of steel bands to each of the major sides of cast rolling slabs in each of the Alloys F to J, the thickness of each cladding plate being about 5% of the total thickness of the composite. The clad slabs were preheated and hot rolled in the normal manner to about 0.25-inch thickness and then cold rolled into sheet, 0.064-inch thick, with several inter-stage annealing treatments, in accordance with the practices normally used in the art. Sample sheets in alloys F, G and H were solution heat-treated in a salt bath for 30 minutes at 530° C., quenched in cold water and stretched to straighten in the usual manner. As detailed in Table 6, sheets in alloys I and J were solution heat-treated at 525 and 520° C., respectively. The sheets in the silver-free alloys, Alloys F, G and H, were artificially aged for 16 hours at 195° C., whereas the silver-containing sheets, Alloys I and J, were aged for 16 hours at 180° C. Additional sheets in Alloy H were solution-treated at 530° C., quenched and aged for 16 hours at 180° C. for comparison purposes.

Suitable test blanks were taken in the transverse direction from random locations in the sheet in each alloy and machined into appropriate test-pieces. The specimens were then tensile tested at room and elevated temperature and creep tested according to the schedules in Tables 5 and 6. The results of these tests on the silver-free and silver-containing alloys are given in Tables 5 and 6.

The improvement in room and elevated temperature tensile properties and in creep resistance, resulting from the addition of 0.20 and 0.31% magnesium to sheet, made according to this invention, and the superiority of sheet with a magnesium content within the preferred range specified hereinbefore, namely 0.25 to 0.4% magnesium, is obvious on comparing the results presented in Table 5 for clad sheet in Alloys F, G and H.

The silver-containing alloy sheets, Alloys I and J, were solution heat-treated at 525 and 520° C., respectively, as over-heating was present in the microstructures and blistering occurred on the surface of sheet solution heat-treated at higher temperatures. Comparison of the test results given in Table 6 for sheet in Alloy I, aged at 180° C., with those for the corresponding silver-free alloy, Alloy H, aged at the preferred temperature for the latter alloy, namely, 195° C., shows the advantage in the room temperature proof stress of the addition of 0.29% silver to sheet made according to this invention, while still maintaining the same high level of creep resistance. Increasing the silver content of the sheet to 0.47%, as in Alloy J, results in a similar level of properties to Alloy I.

The alloys K, L and M were semi-continuously cast into round billets and hot extruded in the normal manner into 1 in. diameter bar. Sample lengths of bar in each alloy were solution treated for 5 hours at 530° C., quenched in cold water and artificially aged for 16 hours at 195° C. and another length in Alloy L was artificially aged for 16 hours at 185° C. after solution treatment and quenching. A further length in Alloy M was solution treated for 5 hours at 520° C., followed by quenching in cold water and aging for 16 hours at 195° C. Suitable longitudinal test-pieces were machined from the bars in the various conditions of heat-treatment and tensile and creep tested at room temperature and 175° C., respectively, according to the schedules in Table 7, which also contain the test results.

TABLE 7

| 1 in. dia. extruded bar | Alloy K: Solution treated 5 hrs. at 530° C., cold water quenched, aged 16 hrs. at 195° C. | | | Alloy L: Solution treated 5 hrs. at 530° C., cold water quenched, aged 16 hrs. at— 185° C. | | | Alloy L: 195° C. | | | Alloy M*: Solution treated 5 hrs. at 520° C., cold water quenched, aged 16 hrs. at 195° C. | | |
|---|---|---|---|---|---|---|---|---|---|---|---|---|
| | 0.1% P.S., tons/sq. in. | U.T.S., tons/sq. in. | Elong., percent | 0.1% P.S., tons/sq. in. | U.T.S., tons/sq. in. | Elong., percent | 0.1% P.S., tons/sq. in. | U.T.S., tons/sq. in. | Elong., percent | 0.1% P.S., tons/sq. in. | U.T.S., tons/sq. in. | Elong., percent |
| Room Temperature, Tensile | 20.1 | 27.8 | 26.3 | 31.6 | 13 | 14 | 26.3 | 31.2 | 15 | 25.8 | 30.4 | 15 |
| Total Plastic Creep Strain (percent) after 100 hrs. at 175° C. with a 10 tons/sq. in. creep stress | | 0.086 | | | 0.060 | | | 0.033 | | | 0.038 | |

*Serious overheating occurred in the specimens containing 0.33% magnesium solution treated for 5 hours at 530° C. but there were no traces in the microstructures of the test-pieces solution treated at 520° C.

The improvement in room temperature tensile properties and elevated temperature creep resistance obtained in the extruded bar containing 0.20% magnesium made according to this invention is evident on comparison of the results for Alloys K and L. Raising the magnesium content to 0.33%, as in Alloy M, produced a similar level of properties to Alloy L. The advantage in creep resistance at 175° C. achieved by ageing Alloy L for 16 hours at 195° C., the preferred treatment, in comparison with ageing for 16 hours at 185° C., is obvious from this table, although there is no difference in room temperature tensile properties.

We claim:

1. An aluminum alloy consisting essentially of elements in the following proportions by weight:

| | Percent |
|---|---|
| Copper | 5 to 7 |
| Titanium | 0.01 to 0.3 |
| Manganese | 0.01 to 0.5 |
| Silicon | 0.01 to 0.35 |
| Magnesium | 0.01 to 0.5 |
| Silver | Up to 0.5 |
| Iron | Up to 0.4 |

Aluminum and impurities the remainder.

2. An aluminum allow consisting essentially of the following elements in the following proportions by weight:

| | Percent |
|---|---|
| Copper | 5.7 to 6.3 |
| Titanium | 0.05 to 0.15 |
| Manganese | 0.1 to 0.3 |
| Silicon | 0.1 to 0.25 |
| Magnesium | 0.15 to 0.4 |
| Iron | Up to 0.4 |
| Nickel | Up to 0.05 |
| Zinc | Up to 0.05 |
| Chromium | Up to 0.05 |

Aluminum and impurities the remainder.

3. An aluminum allow consisting essentially of the following elements in the following proportions by weight:

| | Percent |
|---|---|
| Copper | 5.7 to 6.3 |
| Titanium | 0.05 to 0.15 |
| Manganese | 0.1 to 0.3 |
| Silicon | 0.1 to 0.25 |
| Magnesium | 0.15 to 0.4 |
| Silver | 0.2 to 0.4 |
| Iron | Up to 0.4 |
| Nickel | Up to 0.05 |
| Zinc | Up to 0.05 |
| Chromium | Up to 0.05 |

Aluminum and impurities the remainder.

4. A method of making a wrought article from an aluminum allow according to claim 1, comprising working said alloy into a predetermined form of article, solution heat-treating said article for up to 30 hours between 515 and 550° C., quenching the heat-treated article and then artificially aging the thus-treated article for 5 to 36 hours between 170 and 250° C.

5. A method of making a wrought article from an aluminum allow according to claim [2] *11* comprising forging said alloy, solution heat-treating the resulting article for ½ to 20 hours between 525 and 535° C., quenching the heat-treated forged article and then artificially aging the quenched article.

6. A method of making a wrought article from an aluminum alloy according to claim [2] *12* comprising extruding said alloy, solution heat-treating the resulting article for ½ to 20 hours between 525 and 535° C., quenching the heat-treated extruded article and then artificially aging the quenched article.

7. A method of making a wrought article from an aluminum alloy according to claim [2,] *13* comprising rolling said alloy, solution heat-treating the resulting article for up to 8 hours between 525 and 535° C., quenching the heat-treated article and then artificially aging the quenched article.

8. A method of making a wrought article from an aluminum alloy according to claim [3,] *14* comprising forging said alloy into a predetermined form of article, solution heat-treating said article for ½ to 20 hours between 515 and 535° C., quenching the heat-treated article and then artificially aging the thus-treated article.

9. A method of making a wrought article from an alloy according to claim [3,] *15* comprising extruding said alloy, solution heat-treating the resulting article for [up to 8] ½ *to 20* hours between [525] *515* and 535° C., quenching the heat-treated article, and then artificially aging the quenched article.

10. A method of making a wrought article from an aluminum alloy according to claim [3,] *16* comprising rolling said alloy, solution heat-treating the resulting article for up to 8 hours between 520 and 530° C., quenching said heat-treated article and then artificially aging the quenched article.

11. A forged aluminum article of the alloy according to claim [1] *2* wherein the alloy contains 0.15 to 0.3 percent by weight of magnesium.

12. An extruded aluminum article of the alloy according to claim [1] *2* wherein the alloy contains 0.15 to 0.3 percent by weight of magnesium.

13. A rolled sheet or strip of the aluminum alloy according to claim [1] *2* wherein the alloy contains 0.25 to 0.4 percent by weight of magnesium.

14. A forged aluminum article of the alloy according to claim 3 wherein the alloy contains 0.15 to 0.3 percent by weight of magnesium.

15. An extruded aluminum article of the alloy according to claim 3 wherein the alloy contains 0.15 to 0.3 percent by weight of magnesium.

16. A rolled sheet or strip of the aluminum alloy according to claim 3 wherein the alloy contains 0.25 to 0.4 percent of magnesium.

17. A method according to claim 4 wherein the alloy is quenched in a medium from the group consisting of water, oil and molten salt.

18. A method according to claim 7 wherein the alloy is solution heat-treated for between 5 minutes and 2 hours.

19. A method of making a wrought article according to claim 6, wherein said artificial ageing is for 8 to 24 hours between 190 and 200° C.

20. A method of making a wrought article according to claim 5 wherein said artificial ageing is for 8 to 24 hours between 210 and 220° C.

21. A method according to claim 10 wherein the alloy is solution heat-treated for between 5 minutes and 2 hours.

22. A method of making a wrought article according to claim 8 wherein said artificial ageing is for 8 to 24 hours between 210 and 220° C.

23. A method of making a wrought article according to claim 9 wherein said artificial ageing is for 8 to 24 hours between 190 and 200° C.

24. A method of making a wrought article according to claim 21 wherein said artificial ageing is for 8 to 24 hours between 175 and 185° C.

*25. A method of making a wrought article according to claim 7 wherein said artificial ageing is for 8 to 24 hours between 190 and 200° C.*

*26. A method of making a wrought article according to claim 18 wherein said artificial ageing is for 8 to 24 hours between 190 and 200° C.*

*27. A method of making a wrought article according to claim 10 wherein said artificial ageing is for 8 to 24 hours between 175 and 185° C.*

References Cited

The following references, cited by the Examiner, are of record in the patented file of this patent or the original patent.

UNITED STATES PATENTS

| | | | |
|---|---|---|---|
| 2,459,492 | 1/1949 | Bradbury | 75—143 |

FOREIGN PATENTS

| | | |
|---|---|---|
| 342,729 | 2/1931 | Great Britain. |
| 458,549 | 12/1936 | Great Britain. |
| 518,075 | 2/1940 | Great Britain. |

RICHARD O. DEAN, Primary Examiner

U.S. Cl. X.R.

75—141; 148—12.7, 32.5, 159